(12) United States Patent
Ganis (10) Patent No.: US 9,441,374 B2
(45) Date of Patent: Sep. 13, 2016

(54) STRUTS AND METHODS UTILIZING A COMPRESSION COLLAR

(71) Applicant: Goodrich Corporation, Charlotte, NC (US)

(72) Inventor: Rony Giovanni Ganis, Oakville (CA)

(73) Assignee: Goodrich Corporation, Charlotte, NC (US)

( * ) Notice: Subject to any disclaimer, the term of this patent is extended or adjusted under 35 U.S.C. 154(b) by 259 days.

(21) Appl. No.: 14/248,140

(22) Filed: Apr. 8, 2014

(65) Prior Publication Data

US 2015/0284957 A1 Oct. 8, 2015

(51) Int. Cl.
| | | |
|---|---|---|
| *B25G 3/00* | (2006.01) | |
| *F16D 1/00* | (2006.01) | |
| *F16B 7/14* | (2006.01) | |
| *E04C 3/36* | (2006.01) | |
| *F16L 21/08* | (2006.01) | |
| *F16B 7/02* | (2006.01) | |

(Continued)

(52) U.S. Cl.
CPC . *E04C 3/36* (2013.01); *F16B 7/02* (2013.01); *F16C 3/026* (2013.01); *F16C 7/026* (2013.01); *F16L 21/08* (2013.01); *Y10T 29/49826* (2015.01); *Y10T 29/49947* (2015.01); *Y10T 403/7075* (2015.01)

(58) Field of Classification Search
CPC ........... Y10T 403/4929; Y10T 403/50; Y10T 403/667051; Y10T 403/7052; Y10T 403/7054; Y10T 403/7064; Y10T 403/7069; E04C 7/026; E04C 3/36; F16B 7/02; F16C 3/026; F16L 21/08
USPC ........... 403/277, 286, 341, 367, 370, 374.1, 403/374.4, 404; 464/181, 182
See application file for complete search history.

(56) References Cited

U.S. PATENT DOCUMENTS

| | | | | |
|---|---|---|---|---|
| 756,350 | A * | 4/1904 | Gsrbutt | F16L 33/225 285/255 |
| 2,284,982 | A * | 6/1942 | Miller | B23B 31/38 279/157 |
| 3,560,028 | A * | 2/1971 | Ohba | F16L 33/18 285/255 |

(Continued)

FOREIGN PATENT DOCUMENTS

| | | |
|---|---|---|
| EP | 365391 | 2/1992 |
| GB | 898085 | 6/1962 |
| GB | 2454958 | 5/2009 |

OTHER PUBLICATIONS

Extended European Search Report dated Sep. 11, 2015 in European Application No. 15161315.5.

*Primary Examiner* — Daniel P Stodola
*Assistant Examiner* — Nahid Amiri
(74) *Attorney, Agent, or Firm* — Snell & Wilmer L.L.P.

(57) ABSTRACT

Composite tube assemblies comprising a composite tube comprising a distal end having a first conical section and a second conical section, wherein a distal end of the first conical section is in contact with a proximal end of the second conical section having the same outer diameter as the distal end of the first conical section, wherein a proximal end of the first conical section and a distal end of the second conical section have a smaller outer diameter than the distal end of the first conical section, a locking ring disposed around the first conical section, an end fitting disposed around the second conical section, wherein the end fitting is coupled to the locking ring, and a retaining ring circumferentially disposed around the locking ring are provide.

11 Claims, 9 Drawing Sheets

(51) Int. Cl.
*F16C 3/02* (2006.01)
*F16C 7/02* (2006.01)

(56) References Cited

U.S. PATENT DOCUMENTS

| | | | | | |
|---|---|---|---|---|---|
| 4,790,569 | A | * | 12/1988 | Chaffee | F16L 33/225 285/242 |
| 4,792,320 | A | * | 12/1988 | Nickel | F16C 3/026 464/181 |
| 4,810,010 | A | * | 3/1989 | Jones | E21B 17/085 285/222.4 |
| 5,062,914 | A | * | 11/1991 | Fuchs | B29C 70/86 156/169 |
| 5,318,374 | A | | 6/1994 | Rumberger | |
| 5,868,435 | A | * | 2/1999 | Bartholomew | F16L 27/0816 285/23 |
| 5,956,836 | A | * | 9/1999 | Dupuie | B62D 1/16 29/469.5 |
| 6,042,152 | A | * | 3/2000 | Baldwin | F16L 9/12 285/222.1 |
| 6,282,791 | B1 | * | 9/2001 | Patelczyk | B29C 45/14 264/261 |
| 7,335,108 | B2 | | 2/2008 | Lin et al. | |
| 7,553,553 | B2 | * | 6/2009 | Palumbo | A01K 87/00 428/412 |
| 7,708,610 | B1 | * | 5/2010 | Horan | B63H 16/06 440/101 |
| 7,943,218 | B2 | * | 5/2011 | Knoerzer | B32B 7/12 428/34.7 |
| 8,205,315 | B2 | * | 6/2012 | Mullen | F16C 7/026 280/93.511 |
| 8,365,502 | B2 | * | 2/2013 | Allen | B29C 66/1142 403/265 |
| 8,414,724 | B2 | | 4/2013 | Schnelz | |
| 8,419,887 | B2 | * | 4/2013 | Kennedy | F16C 7/02 156/158 |
| 8,430,759 | B2 | | 4/2013 | Wanthal | |
| 2001/0001769 | A1 | | 5/2001 | Kimoto | |
| 2008/0119296 | A1 | * | 5/2008 | Kennedy | B29C 53/562 464/181 |

* cited by examiner

STRUTS AND METHODS UTILIZING A COMPRESSION COLLAR

FIELD

The present disclosure relates to composite tube assemblies and methods of manufacture of composite tube assemblies.

BACKGROUND

Composite tubes are often used due to their high strength and low weight in industries where weight is a significant factor, such as in the aircraft and automotive industry (e.g., a strut). Composite tubes often comprise fibers and/or filaments reinforced with thermosets and/or thermoplastics. Conventional composite tube assemblies typically may have a metallic end fitting bonded to a composite tube and, thus, hinder reuse of the metallic end fittings when replacing a composite tube.

SUMMARY

Composite tube assemblies are provided comprising a composite tube comprising a distal end having a first conical section and a second conical section, wherein a distal end of the first conical section is in contact with a proximal end of the second conical section having the same outer diameter as the distal end of the first conical section, wherein a proximal end of the first conical section and a distal end of the second conical section have a smaller outer diameter than the distal end of the first conical section, a locking ring disposed around the first conical section, an end fitting disposed around the second conical section, wherein the end fitting is coupled to the locking ring, and a retaining ring circumferentially disposed around the locking ring.

Methods are provided comprising disposing a retaining ring around a composite tube, wherein a distal end of the composite tube comprises a first conical section and a second conical section, wherein a distal end of the first conical section is in contact with a proximal end of the second conical section having the same outer diameter as the distal end of the first conical section, wherein a proximal end of the first conical section and a distal end of the second conical section have a smaller outer diameter than the distal end of the first conical section, disposing an end fitting around the second conical section, disposing a locking ring around the first conical section of the composite tube so the retaining ring circumferentially surrounds the locking ring disposed around the first conical section, and coupling the locking ring to the end fitting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

Figure 1A:
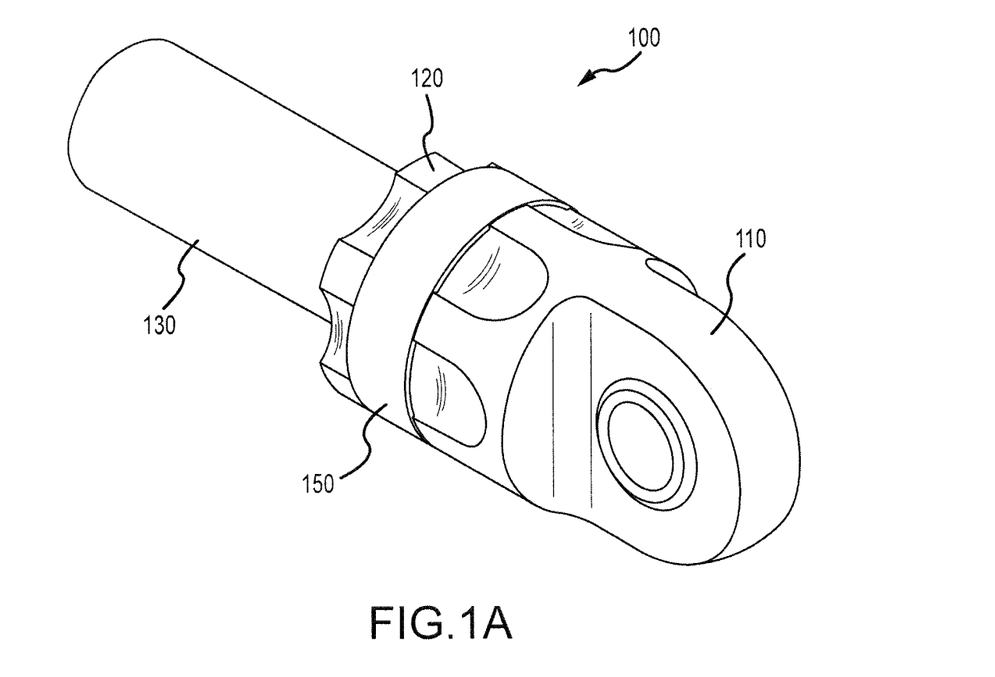
FIG. 1A illustrates a composite tube assembly, in accordance with various embodiments.

With reference to FIG. 1A, FIG. 1A illustrates composite tube assembly 100, in accordance with various embodiments. Composite tube assembly 100 may comprise a composite tube 130, a locking ring 120, an end fitting 110, and a retaining ring 150 circumferentially disposed around the locking ring 120.

According to various embodiments, composite tube 130 may comprise lightweight polymer-matrix composite ("PMC") materials to utilize the anisotropic properties of the PMC material. As used herein, PMC materials may include carbon-fiber-reinforced polymers, such as carbon-fiber-reinforced plastics and carbon-fiber reinforced thermoplastics, whether now known or hereinafter developed. As used herein, the term "carbon-fiber-reinforced polymer" may include any now known or hereinafter developed material that comprises a fibrous material network (such as a network of carbon fiber) and a polymer, such as graphite epoxy. According to various embodiments, the PMC material may comprise any now known or hereinafter developed fibers. For example, in various embodiments, PMC materials may comprise aramid fibers and/or para-aramid, such as Kevlar®, a registered mark of the E. I. Du Pont de Nemours and Company, Nomex®, also a registered mark of the E. I. Du Pont de Nemours and Company, and Technora®, a registered mark of the Teijin Corporation.

According to various embodiments, the end fitting 110 is not particularly limited. According to various embodiments, the end fitting 110 may comprise at least one of a clevis, a single bearing lug, and other known or hereinafter developed geometries for end fittings. In various embodiments, the end fitting 110 may comprise various materials, for example, a metal. Exemplary metals according to various embodiments include at least one of aluminum, tungsten, titanium, nickel, molybdenum, steel, cobalt, chromium, and alloys thereof. For example, according to various embodiments, the end fitting 110 may comprise various materials, for example steel alloys, such as high strength low alloy steel ("HSLA") that is commercially known as 300M, and/or high strength steel, such as Aermet® 100, a registered trademark of the Carpenter Technology Corporation, and/or titanium alloys, such as Ti 6Al-4V, commercially available from the Titanium Metal Corporation as Ti 6Al-4V ELI.

In various embodiments, the locking ring 120 is not particularly limited. According to various embodiments, the locking ring 120 may be a single integral piece or may comprise a plurality of pieces (e.g., two halves). As used herein, the term "integrated" or "integral" may include forming one, single continuous piece. In various embodiments, the locking 120 may comprise various materials, for example, a metal. Exemplary metals according to various embodiments include at least one of aluminum, tungsten, titanium, nickel, molybdenum, steel, cobalt, chromium, and alloys thereof. For example, according to various embodiments, the locking ring 120 may comprise various materials, for example, steel alloys, such as high strength low alloy steel ("HSLA") that is commercially known as 300M, and/or high strength steel, such as Aermet® 100, a registered trademark of the Carpenter Technology Corporation, and/or titanium alloys, such as Ti 6Al-4V, commercially available from the Titanium Metal Corporation as Ti 6Al-4V ELI.

According to various embodiments, the retaining ring 150 is not particularly limited. In various embodiments, the retaining ring 150 may comprise various materials, for example, a PMC material and/or a metal. According to various embodiments, the PMC material is not particularly limited and may comprise any known PMC material (e.g., graphite epoxy) or any PMC material hereinafter developed. In various embodiments, the PMC material may comprise aramid fibers and/or para-aramid fibers, such as Kevlar®, a registered mark of the E. I. Du Pont de Nemours and Company, Nomex®, also a registered mark of the E. I. Du Pont de Nemours and Company, and Technora®, a registered mark of the Teijin Corporation. Exemplary metals according to various embodiments include at least one of aluminum, tungsten, titanium, nickel, molybdenum, steel, cobalt, chromium, and alloys thereof. For example, according to various embodiments, the retaining ring 150 may comprise various materials, for example, steel alloys, such as high strength low alloy steel ("HSLA") that is commercially known as 300 M, and/or high strength steel, such as Aermet® 100, a registered trademark of the Carpenter Technology Corporation, and/or titanium alloys, such as Ti 6Al-4V, commercially available from the Titanium Metal Corporation as Ti 6Al-4V ELI.

Figure 1B:
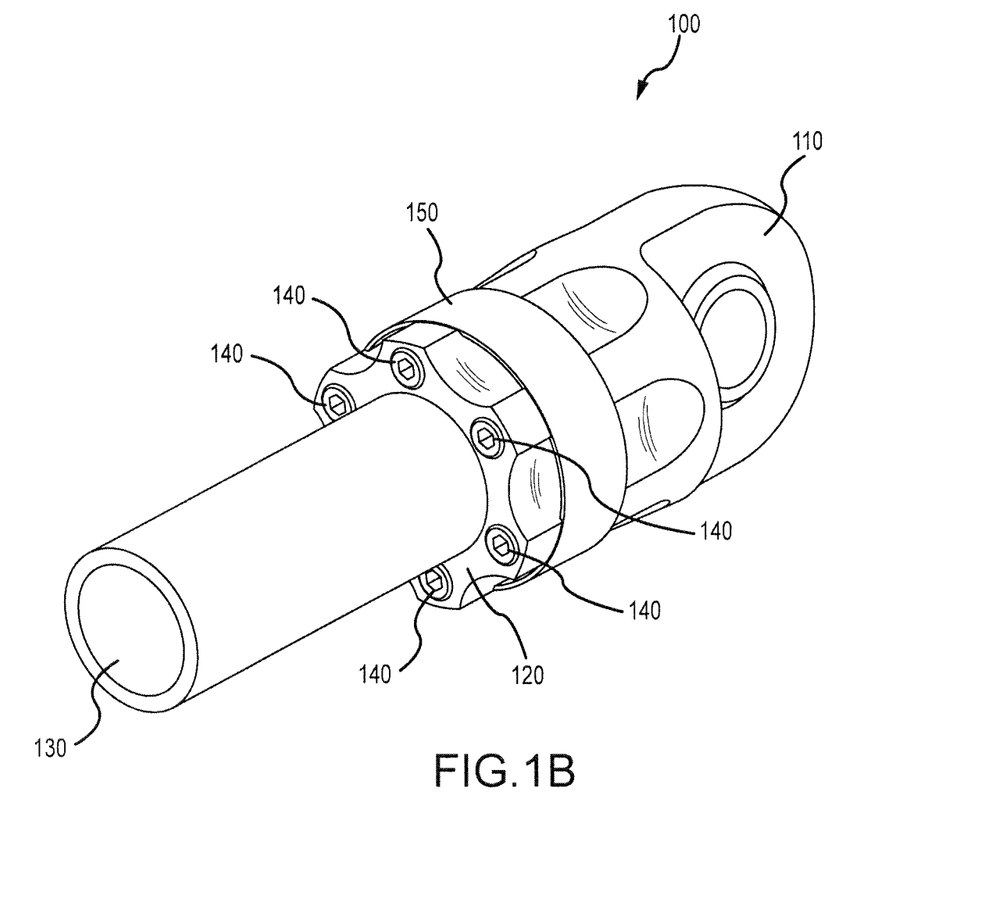
FIG. 1B illustrates a composite tube assembly, in accordance with various embodiments.

With reference to FIG. 1B, 1B illustrates composite tube assembly 100, in accordance with various embodiments. As can be seen in FIG. 1B, according to various embodiments of composite tube assembly 100, locking ring 120 may be coupled to the end fitting 110. In various embodiments, end fitting 110 may be coupled to the locking ring 120 with retention bolts 140. As previously described, locking ring 120 is not particularly limited and may be formed as an integral piece or may comprise a plurality of pieces. Accordingly, in various embodiments, retaining ring 150 may be circumferentially disposed around the locking ring 120.

Figure 2A:
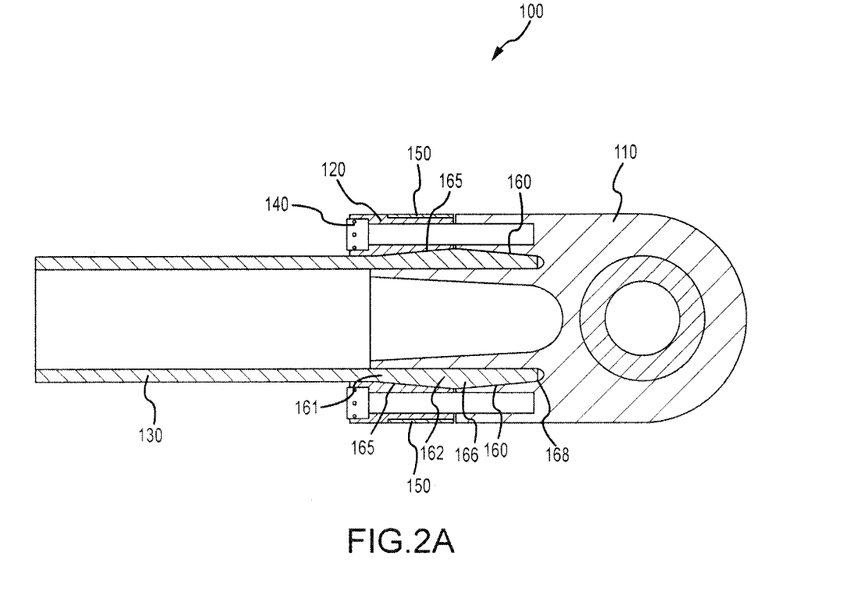
FIG. 2A illustrates a cross-sectional view of a composite tube assembly, in accordance with various embodiments.
Figure 2B:
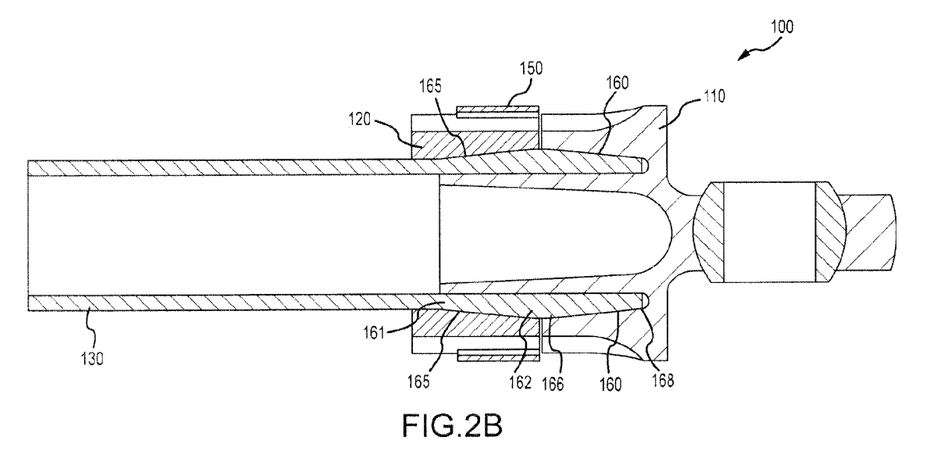
FIG. 2B illustrates a cross-sectional view of a composite tube assembly, in accordance with various embodiments.

With reference to FIGS. 2A and 2B, FIGS. 2A and 2B illustrate various cross-sectionals view of composite tube assembly 100, in accordance with various embodiments. As can be seen in FIGS. 2A and 2B, composite tube assembly 100 may comprise a composite tube 130 comprising a distal end having a first conical section 165 and a second conical section 160. According to various embodiments, a distal end 162 of the first conical section 165 may be in contact with a proximal end 166 of the second conical section 160. In various embodiments, and as illustrated in FIG. 2B, the proximal end 166 of the second conical section 160 may have the same size outer diameter as the distal end 162 of the first conical section 165. According to various embodiments, a proximal end 161 of the first conical section 165 and the distal end 168 of the second conical section 160 may have a smaller outer diameter than the distal end 162 of the first conical section 165. In various embodiments, the first conical section 165 and the second conical section 160 may be surface treated with any known or hereinafter developed methods of surface treatment for PMC materials (e.g., nanocoated, coated with polytetrafluoroethylene ("PTFE"), coated with a metallic thermal spray, etc.). As used herein, the term "nanocoated" is not particularly limited and may include any now known or hereinafter developed methods of coating PMC materials with nanomaterials, while the term "nanomaterials" refers to a material comprised of particles that have at least one dimension between 0.1 nm and 1000 nm. According to various embodiments, various nanocoatings may increase the resistance of the composite tube 130 against frictional wear, such as frictional wear from end fitting 110.

In various embodiments, the locking ring 120 may be coupled to the end fitting 110. For example, FIG. 2A illustrates locking ring 120 coupled to the end fitting 110 via retention bolts 140. In various embodiments, the inner surface of locking ring 120 may have an inner diameter that matches the first conical section 165 of the composite tube 130. Moreover, as can be seen in FIG. 2A, composite tube assembly 100 may comprise a retaining ring 150 which may surround a portion of the locking ring 120 according to various embodiments. According to various embodiments, locking ring 120 may comprise a tapered section configured to receive the retaining ring 150. In various embodiments, retaining ring 150 may help secure locking ring 120.

Figure 2C:
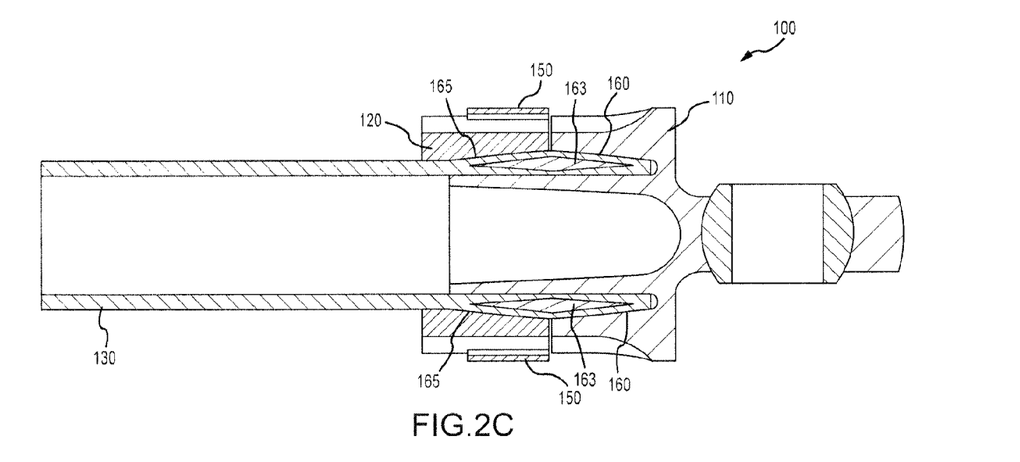
FIG. 2C illustrates a cross-sectional view of a composite tube assembly, in accordance with various embodiments.

With temporary reference to FIG. 2C, FIG. 2C illustrates composite tube assembly 100 according to various embodiments. According to various embodiments, composite tube assembly 100 may comprise a locking ring 120 disposed around first conical section 165, a retaining ring 150 circumferentially disposed around the locking ring 120, and an end fitting 110 coupled to the locking ring 120. In various embodiments, the first conical section 165 and second conical section 160 of composite tube 130 may comprise a metallic insert 163. In various embodiments the metallic insert 163 may be bonded to the composite tube 130 (e.g., with an adhesive). In various embodiments, metallic insert 163 may be co-molded with the composite tube 130. In various embodiments, the metallic insert 163 may be co-cured with the composite tube 130. Accordingly, in various embodiments, the metallic insert 163 may be both co-molded and co-cured with the composite tube 130. Various adhesives may be used to bond and/or co-cure the metallic insert 163 to the composite tube 130 and, thus, in various embodiments, the adhesive is not limited. For example, in various embodiments, the adhesive may include any known or hereinafter developed adhesive suitable for PMC materials, such as an epoxy adhesive. An exemplary epoxy adhesive, according to various embodiments, may include Epovex®, commercially available from Zyvex Performance Materials, Incorporated.

Figure 3:
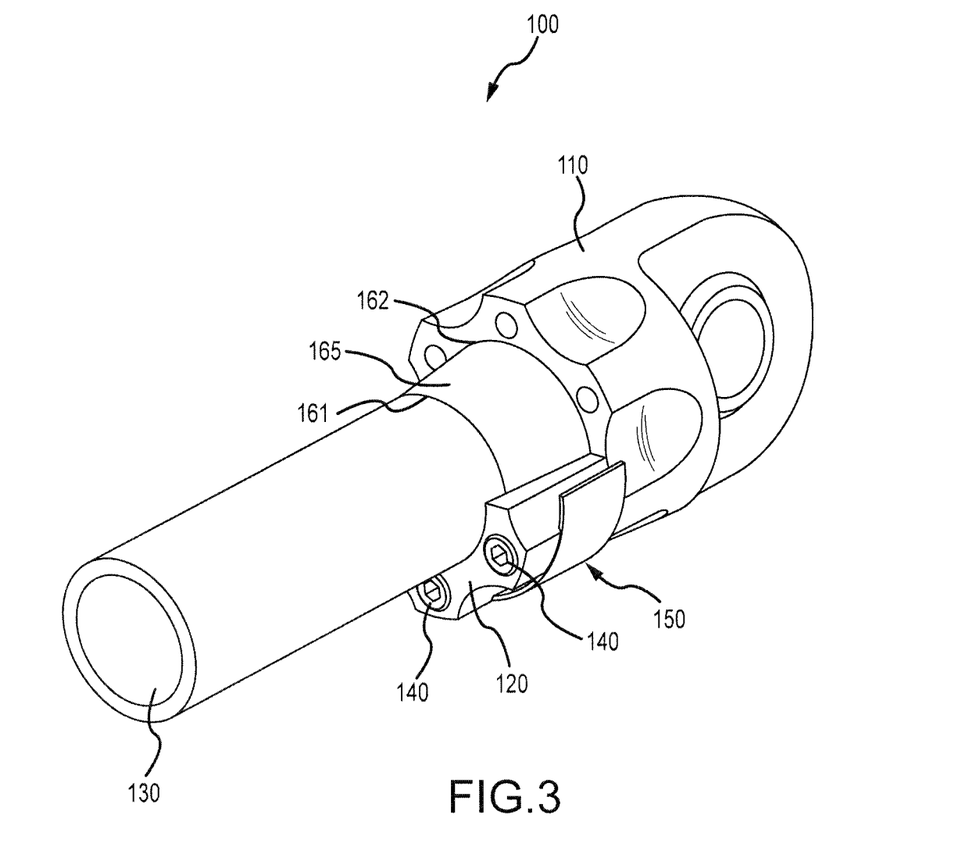
FIG. 3 illustrates a view of a composite tube assembly, in accordance with various embodiments.

For example, in various embodiments the locking ring 120 may comprise a plurality of pieces (e.g., two halves of a locking ring). For example, in various embodiments, the locking ring 120 may comprise two pieces separately manufactured. For example, with reference to FIG. 3, FIG. 3 illustrates composite tube assembly 100 with one half of the locking ring 120 removed and, thus, showing both a proximal end 161 and distal end 162 of first conical section 165. As can be seen in FIG. 3, locking ring 120 may be secured to end fitting 110 via retention bolts 140. In various embodiments, retaining ring 150 (only partially shown for clarity) may be configured to hold the locking ring 120 together. For example, in various embodiments the retaining ring 150 may help to retain various axial loads that may try to separate the locking ring 120 from first conical section 165.

Figure 4:
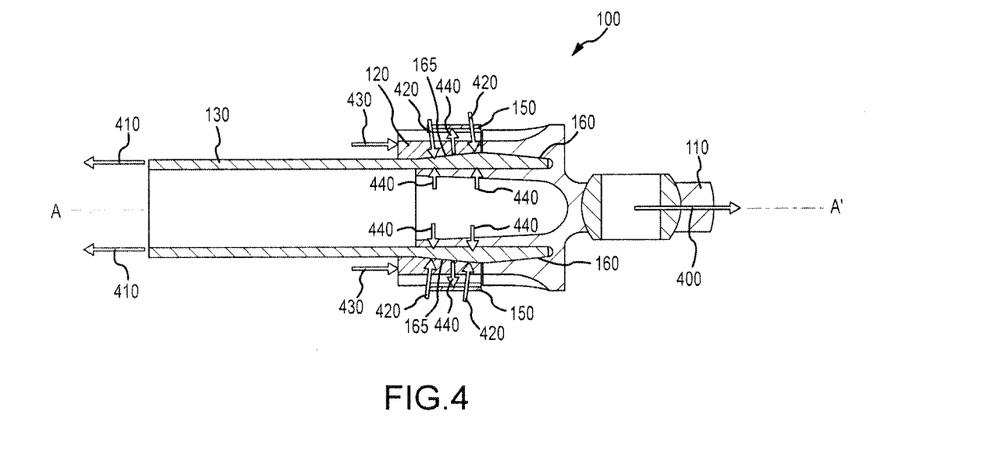
FIG. 4 illustrates a cross-sectional view of a composite tube assembly, in accordance with various embodiments.

For example, with reference to FIG. 4, FIG. 4 illustrates composite tube assembly 100 under a tensile load 400 in accordance with various embodiments. In various embodiments, at times when a tensile load 400 is applied to end fitting 110 disposed around second conical section 160, this may cause a longitudinal tensile load 430 on locking ring 120, which may be coupled to end fitting 110 (e.g., with retention bolts 140 as illustrated in FIG. 2A). The longitudinal tensile load 430 on locking ring 120 may exert a radially outward load 440 on locking ring 120 due to the configuration of end fitting 110 and the configuration of the inner diameter of locking ring 120 and the first conical section 165 of composite tube 130. As used herein, the term "radially" may include a direction primarily directed towards and/or away from a longitudinal axis of the composite tube 130. For example, in various embodiments a radially outward compressive force may be primarily directed away from axis A-A' and, thus, may not necessarily be orthogonal to axis A-A' shown in FIG. 4.

However, in various embodiments, the locking ring 120 may be held in place with the retention bolts 140 (illustrated in FIG. 2A) and with the retaining ring 150. In various embodiments, the placement of retaining ring 150 may result in a radially compressive force 420, which, in various embodiments, may help keep locking ring 120 disposed around first conical section 165 and coupled to end fitting 110. The continued disposition of locking ring 120 around first conical section 165 and the continued coupling of locking ring 120 to end fitting 110 may, in various embodiments, result in a longitudinal tensile load 410 on the composite tube 130. In various embodiments, the composite tube 130 may be configured to not collapse in response to longitudinal tensile load 410 and, thus, composite tube 130 may react to tensile load 400 applied to end fitting 110.

Figure 5:
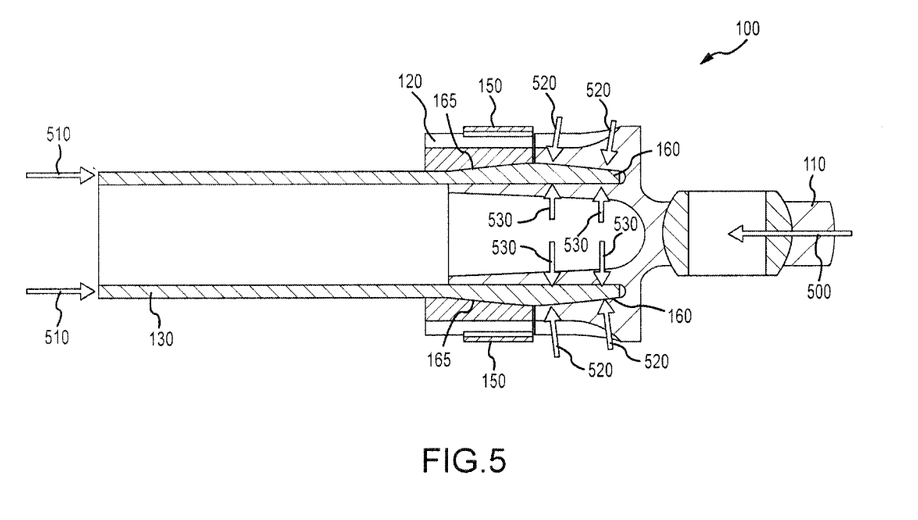
FIG. 5 illustrates a cross-sectional view of a composite tube assembly, in accordance with various embodiments.

With reference to FIG. 5, FIG. 5 illustrates composite tube assembly 100 under a compressive load 500 in accordance with various embodiments. In various embodiments, compressive load 500 may be applied to end fitting 110, which may be coupled to locking ring 120 disposed around first conical section 165 and circumferentially surrounded by retaining ring 150. At times when compressive load 500 is applied to end fitting 110, the compressive load 500 may be transferred to the second conical section 160 of composite tube 130. In various embodiments, the end fitting 110 may be disposed around the second conical section 160 located at a distal end of composite tube 130 so that the compressive load 500 may be transferred to the second conical section 160 as an internal compressive load 530 and an outer compressive load 520. Accordingly, in various embodiments, the internal compressive load 530 and the outer compressive load 520 may result in longitudinal compressive load 510 on composite tube 130. In various embodiments, the composite tube 130 may be configured to not collapse in response to longitudinal compressive load 510 and, thus, composite tube 130 may react to compressive load 500 applied to end fitting 110.

Figure 6:
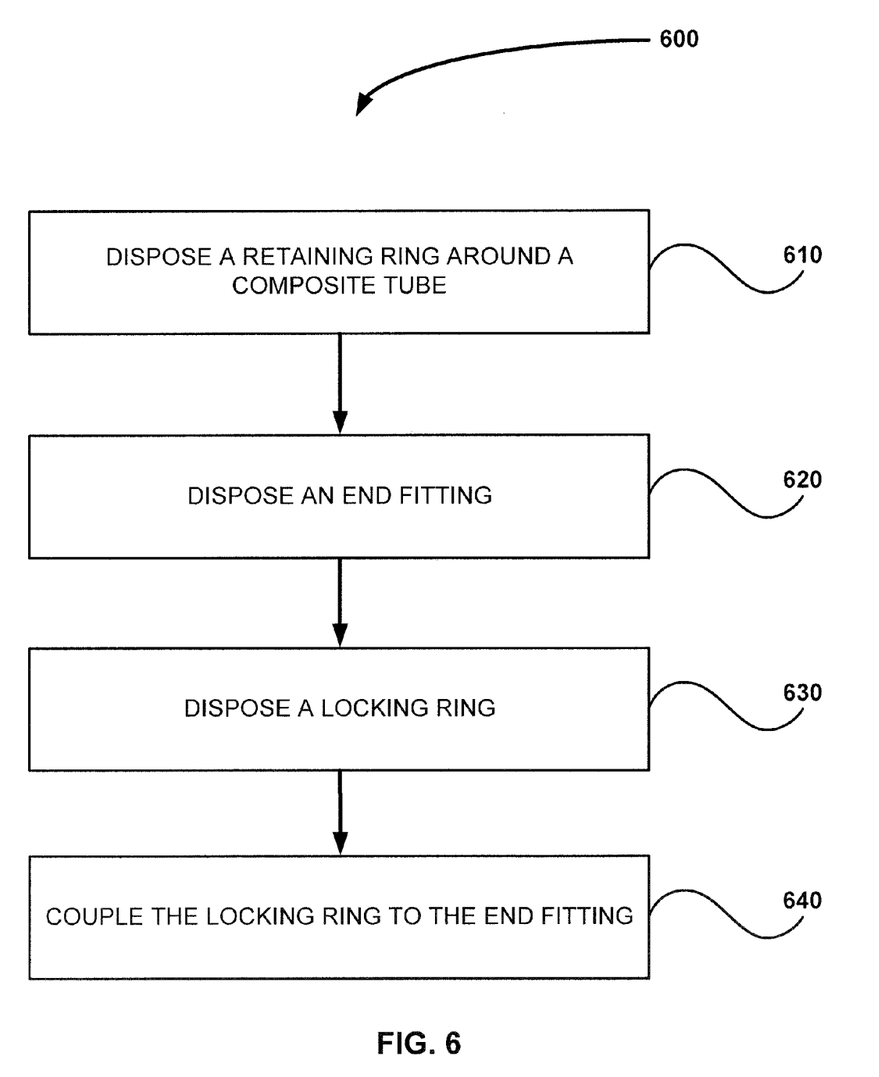
FIG. 6 illustrates a method of manufacture, in accordance with various embodiments.

With reference to FIG. 6, FIG. 6 illustrates method 600 of manufacturing a composite tube assembly 100, according to various embodiments. First, a retaining ring 150 may be disposed around a composite tube 130 (step 610). In various embodiments and with temporary reference to FIG. 2A, a distal end of the composite tube 130 may comprise a first conical section 165 and a second conical section 160, wherein a distal end 162 of the first conical section 165 is in contact with a proximal end 166 of the second conical section 160. In various embodiments, the proximal end 166 of the second conical section 160 may have the same outer diameter as the distal end 162 of the first conical section 165, for example, as illustrated in FIG. 2A. According to various embodiments, a proximal end 161 of the first conical section 165 and the distal end 168 of the second conical section 160 may have a smaller outer diameter than the distal end 162 of the first conical section 165. In various embodiments, the composite tube 130 may comprise a metallic insert 163, as illustrated in FIG. 2C.

With reference back to FIG. 6, in various embodiments, method 600 may comprise disposing an end fitting 110 around the second conical section 160 of the composite tube 130 (step 620). According to various embodiments, method 600 may also comprise disposing a locking ring 120 around the first conical section 165 of the composite tube 130 so the retaining ring 150 circumferentially surrounds the locking ring 120 disposed around the first conical section 165 (step 630). In various embodiments, the locking ring 120 is not particularly limited. For example, in various embodiments, the locking ring 120 may comprise a plurality of pieces (e.g., two halves). According to various embodiments, a locking ring 120 having a plurality of pieces may facilitate manufacture of composite tube assembly 100. Further, in various embodiments where the locking ring 120 comprises a plurality of pieces, the retaining ring 150 may help to prevent the axial separation of the locking ring 120 from the first conical section 165. In various embodiments, method 600 may also comprise coupling the locking ring 120 to the end fitting 110 (step 640). For example, in various embodiments, retention bolts 140 may be used to couple the locking ring 120 to the end fitting 110.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. §112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A composite tube assembly comprising:
   a composite tube comprising a distal end having a first conical section and a second conical section,
   wherein a distal end of the first conical section is in contact with a proximal end of the second conical section having the same outer diameter as the distal end of the first conical section,
   wherein a proximal end of the first conical section and a distal end of the second conical section have a smaller outer diameter than the distal end of the first conical section;
   a locking ring disposed around the first conical section;
   an end fitting disposed around the second conical section and internal to the composite tube, wherein the end fitting is coupled to the locking ring; and
   a retaining ring circumferentially disposed around the locking ring.

2. The composite tube assembly of claim 1, wherein the end fitting is coupled to the locking ring with retention bolts.

3. The composite tube assembly of claim 1, wherein the locking ring comprises a plurality of pieces.

4. The composite tube assembly of claim 1, wherein the retaining ring comprises carbon fiber.

5. The composite tube assembly of claim 1, wherein the retaining ring comprises a metal.

6. The composite tube assembly of claim 1, wherein the first conical section and the second conical section are nanocoated.

7. The composite tube assembly of claim 1, wherein the first conical section and the second conical section comprise a metallic insert.

8. The composite tube assembly of claim 7, wherein the metallic insert is co-molded with the composite tube.

9. The composite tube assembly of claim 7, wherein the metallic insert is bonded with the composite tube.

10. The composite tube assembly of claim 7, wherein the metallic insert is co-cured with the composite tube.

11. The composite tube assembly of claim 1, wherein the outer diameter of the distal end of the second conical section is the same size as the proximal end of the first conical section.

* * * * *

UNITED STATES PATENT AND TRADEMARK OFFICE
CERTIFICATE OF CORRECTION

| | |
|---|---|
| PATENT NO. | : 9,441,374 B2 |
| APPLICATION NO. | : 14/248140 |
| DATED | : September 13, 2016 |
| INVENTOR(S) | : Rony Giovanni Ganis |

It is certified that error appears in the above-identified patent and that said Letters Patent is hereby corrected as shown below:

On the Title page, item (57), line 13, please delete "provide" and insert therefor --provided--.

Signed and Sealed this
Fifteenth Day of November, 2016

Michelle K. Lee
*Director of the United States Patent and Trademark Office*